United States Patent [19]

Trostmann et al.

[11] 4,047,478
[45] Sept. 13, 1977

[54] APPARATUS FOR THE PRODUCTION OF ROLLED FOOD PRODUCTS

[75] Inventors: Erik Trostmann, Birkerod; Ove Albertsen, Lyngby, both of Denmark

[73] Assignee: Dansk Styreteknik A/S, Denmark

[21] Appl. No.: 588,319

[22] Filed: June 19, 1975

[30] Foreign Application Priority Data

June 24, 1974 Denmark ............................. 3381/74

[51] Int. Cl.² .......................... A23P 1/00; A21C 11/00
[52] U.S. Cl. .................................... 99/450.1; 426/502
[58] Field of Search ................. 99/450.1, 450.2, 450.6, 99/450.7; 53/206, 210; 426/297, 502

[56] References Cited

U.S. PATENT DOCUMENTS 3,633,517  1/1972  Kao ..................................... 99/450.6
3,669,007  6/1972  Pulici .................................. 99/450.6
3,850,088  11/1974  Tobey et al. .................... 99/450.7 X Primary Examiner—Robert W. Jenkins
Attorney, Agent, or Firm—Watson, Cole, Grindle & Watson

[57] ABSTRACT

An apparatus for the production of Chinese spring rolls and other rolled food products wherein a flat pancake is deposited on a gas permeable conveyor belt and a filler substance is placed atop said pancake, wherein said pancake successively is passed above air jets directed against the underside of said pancake to fold the front portion and opposite side portions of the flat pancake over said filling substance and wherein the folded pancake together with the filler substance finally is rolled toward the rear edge of said pancake to form a roll fully enclosing said filler substance.

9 Claims, 2 Drawing Figures

APPARATUS FOR THE PRODUCTION OF ROLLED FOOD PRODUCTS

BACKGROUND OF THE INVENTION

This invention relates to an apparatus for the production of rolled food products comprising a filler substance and a wrap folded onto and rolled around said filler substance the apparatus of the invention performs the steps of depositing a flat wrap on a support, placing a filler substance atop the flat wrap, folding the front portion of said wrap onto said filler substance, folding the opposite side portions of said wrap onto the partially enclosed filler substance, and finally rolling the folded wrap with its filler towards the rear edge of said wrap to form a roll.

An apparatus of this type is used for the production of e.g., raw Chinese spring rolls. In Chinese spring rolls, the filler substance may consist of sliced cabbage, minced meat and spices, and the wrap may consist of a substantially rectangular pancake made from flour and water.

Such spring rolls are primarily produced by effecting the folding and the rolling operations manually on a table.

An apparatus for mechanically folding and rolling the wrap around the filler substance has been developed, and such apparatus is constructed in a manner so that the front portion of the wrap and the opposite side portions thereof are caught by mechanical devices and successively folded onto the filler substance. Subsequently, the filler substance and the folded portions of the wrap are mechanically rolled towards the rear edge of the wrap.

The prior art apparatus is rather complicated, and furthermore, the production rate has not been significantly increased compared to that of the manual production of Chinese spring rolls.

The object of the invention is to obtain an increased production rate in the production of Chinese spring rolls and similar food products.

A further object of the invention is to eliminate mechanical devices for the folding of the front and side portions of the wrap onto the filler substance.

SUMMARY OF THE INVENTION

The invention is based on the discovery that a flat wrap in the form of a newly prepared pan cake has such properties that it is not penetrated when its front and side portions are subjected to the influence of flowing media directed against its underside, but that such portions of the wrap are raised from the support and falls onto the filler substance. The invention is also based on the discovery that the folded portions of the pancake remain in their folded position and do not tend to return to the original position.

The invention is characterized in that the folding operations are effected with at least one flowing medium.

Examples of such flowing media are streams of gas, e.g., air, liquid and a particulate material. The folding may also be effected by creating a vacuum above the portions of the wrap to be folded onto the filler substance.

The folding operations are preferably effected with gas streams which are directed against the underside of the portions of the wrap to be folded onto the filler substance. By using such gas streams, a number of fixed gas orifices which are located either below the zone in which the flat wrap is placed on a support, or in a path through which the flat wrap is passed when the folding and rolling operations are carried out.

When using the apparatus of the invention which permits a continuous production of rolled food products, it is possible to produce about 9000 Chinese spring rolls per hour whereas the production rate of a prior art apparatus is about 900 Chinese spring rolls per hour. Thus, the production rate can be increased by a factor of about 10.

A further advantage of the invention is that a number of Chinese spring rolls or similar products can be produced simultaneously or successively on a single support. Thus, several flat wraps can be placed side by side or longitudinally spaced on a conveyor belt, and the belt may be passed above or along means for effecting the above-mentioned functions.

This apparatus comprises a support for supporting a flat wrap and a filler substance placed atop the flat wrap, means for successively folding the front portion and the opposite side portions of the wrap onto the filler substance and means for rolling the folded wrap with its filler substance towards the rear edge of said wrap. The apparatus of the invention is characterized in that the means for successively folding the front and opposite side portions of the wrap comprises means for generating a superatmospheric pressure below said portions or means for generating a vacuum above said portions or combinations thereof.

In a particularly preferred embodiment of the apparatus of the invention the support comprises an endless horizontally located gas permeable conveyor belt, orifices for temporarily generating gas streams directed upwardly, and located below the upper run of said conveyor belt so as to fold the front portion of the wrap onto the filler substance and orifices located at both sides of the conveyor belt to generate gas streams directed upwardly so as to fold the opposite side portions of the wrap onto the filler substance.

The apparatus preferably also comprises a compressing means which is located above the upper run of the conveyor belt and at such a distance from the upper run that it produces a rolling of the partially folded wrap and its filler substance over about 270° before the opposite side portions are folded onto the filler substance.

The final rolling of the folded wrap and the filler substance is preferably effected by a second compression means located above the upper run of the conveyor belt.

In order to obtain predetermined fold lines when folding the opposite side portions of the wrap onto the filler substance, folding rods are preferably provided adjacent to the upper run of the conveyor belt and on both sides of the center line of the belt, said folding rods extending parallel with the center line or forming an acute angle with said center line of the conveyor belt.

When the wrap is contacted with said folding rods, the latter ensure that only that portion of the wrap which is located outside the zone between said rods is folded onto the filler substance.

Figure 1:
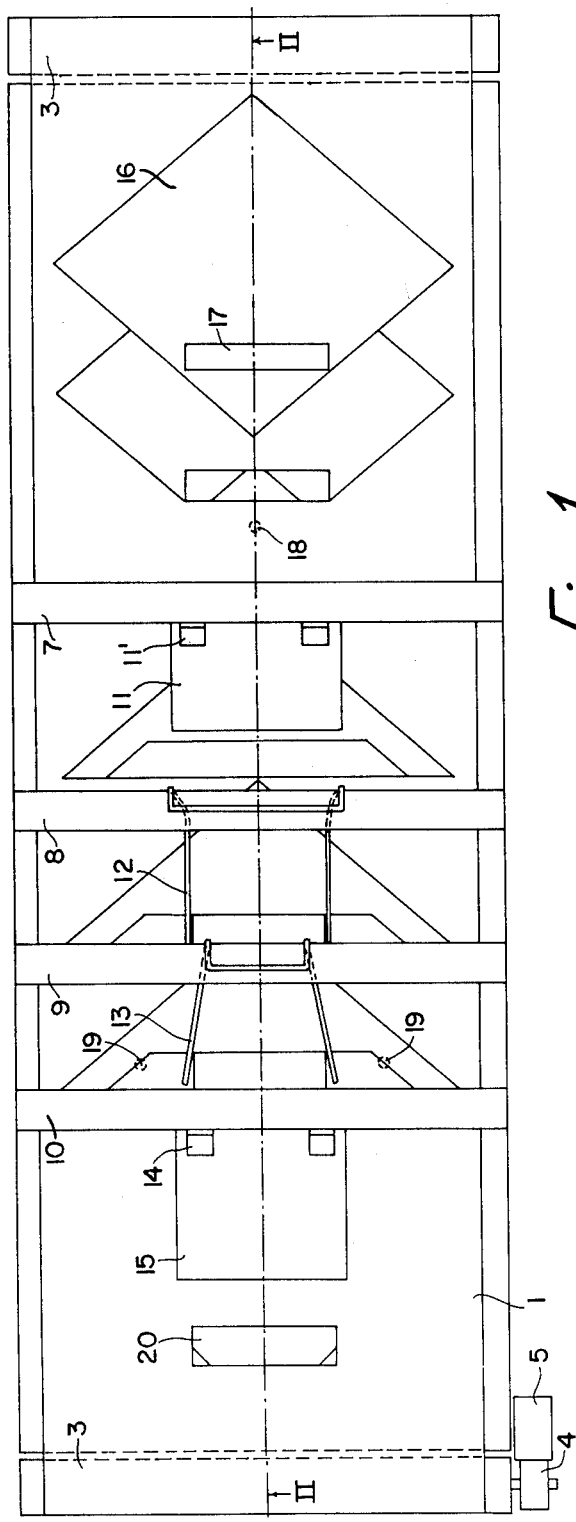
FIG. 1 shows a preferred embodiment of the apparatus of the invention in a schematic plan view and illustrating a wrrap and a filler substance located thereon in four progressive positions.
Figure 2:
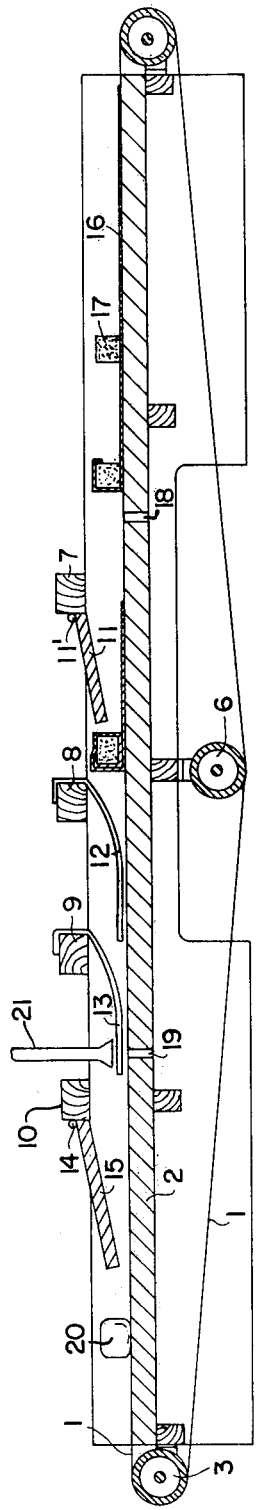
FIG. 2 shows a vertical section to the apparatus illustrated in FIG. 1 taken along the line 11-11.

The apparatus shown comprises an endless conveyor belt 1 having an upper run passing above a support 2, and supported at the ends by two rollers 3 of which one is driven by a gear 4 and a motor 5. A further roller 6 is located below the support 2, said roller 6 also being in contact with the conveyor belt 1. Four cross beams 7, 8, 9 and 10 extend transversely of the conveyor belt 1, and one of these cross beams 7 supports a plate 11 which is pivotably mounted in a hinged joint 11'. The second cross beam 8 supports two folding rods 12 extending longitudinally of the belt 1. The cross beam 9 also supports two folding rods 13 which form an acute angle with the center line of the belt 1.

The cross beam 10 supports a plate 15 which is pivotly mounted by means of a hinged joint 14.

The operation of the apparatus shown is as follows:

At the inlet end of the apparatus, a flat wrap 16 is placed on the belt 1. A filler substance 17, e.g., in the form of a frozen body, is placed on top of the wrap 16 at the front edge of said wrap. During the passage of the conveyor belt along the support 2, the front edge of the wrap 16 passes above an orifice 18 from which a stream of air temporarily is directed upwardly. This stream of air causes the front edge of the wrap 16 to fold onto the filler substance 17. During the passage below the plate 11 which exerts a predetermined pressure on the body comprising the partially folded wrap and the filler substance, said body is caused to roll. Subsequently, the body thus obtained passes below the cross beam 8 where the folding rods 12 compress the wrap close to the ends of the filler substance 17. Subsequently, the side portions of the wrap 16 passes above two orifices 19 generating air streams which are directed upwardly and below two orifices 21 creating partial vacuums both of which cause the side portions of the wrap to fold onto the filler substance 17, the folding rods 13 defining the folding lines. The orifices 19 and 21 may be used either in combination or separately.

The body thus obtained is then passed below the pivotably mounted plate 15 and by contacting said plate it is subjected to a further rolling so as to form a final roll 20 in which the filler substance 17 is completely enclosed in the wrap 16.

We claim:

1. An apparatus for producing rolled food products comprising a support for supporting a flat wrap and a filler substance placed atop the flat wrap, means for successively folding the front portion and the opposite side portions of the wrap onto the filler substance and means for rolling the folded wrap with its filler substance towards the rear edge of said wrap, the means for successively folding the front and opposite side portions of the wrap onto the filler substance comprises means for generating a pressure differential across said portions, the pressure above said portions being less than the pressure below said portions.

2. An apparatus according to claim 1, wherein there is further included means for effecting a rolling of the partially folded wrap and its filler substance before the folding of the opposite side portions of the wrap.

3. An apparatus according to claim 2, wherein the means for generating a pressure differential is a means for generating a superatmospheric pressure below said portions.

4. An apparatus according to claim 3, wherein the support is an endless horizontally located, gas permeable conveyor belt, said means for generating comprises at least one orifice for temporarily generating gas streams directed upwardly therefrom, said orifice being located below the upper run of said conveyor belt so as to fold said portions of the wrap onto the filler substance.

5. An apparatus according to claim 4, wherein there are further included folding rods mounted on both sides of the center line of the conveyor belt, said folding rods extending parallel with said center line, said folding rods defining folding lines for folding of the opposite side portions of the wrap.

6. An apparatus according to claim 5, wherein there is further included a second set of folding rods mounted on both sides of the center line of the conveyor belt, said second set of folding rods forming an acute angle with said center line, and said second set of folding rods further defining the folding lines.

7. An apparatus according to claim 4, wherein a plurality of orifices are provided for temporarily generating upwardly directed gas streams, said orifices being located so as to fold the front and opposite side portions of the wrap onto the filler substance.

8. An apparatus according to claim 4, wherein there are further included folding rods mounted on both sides of the center line of the conveyor belt, said folding rods forming an acute angle with said center line, said folding rods defining folding lines for folding of the opposite side portions of the wrap.

9. An apparatus according to claim 1, wherein the means for generating a pressure differential is a means for generating a partial vacuum above said portions.

* * * * *